(12) United States Patent  
Murphy

(10) Patent No.: US 7,104,365 B1  
(45) Date of Patent: Sep. 12, 2006

(54) BRAKE ACTUATOR INDICATOR

(75) Inventor: Wayne H. Murphy, Pottstown, PA (US)

(73) Assignee: Pennsy Corporation, West Chester, PA (US)

( * ) Notice: Subject to any disclaimer, the term of this patent is extended or adjusted under 35 U.S.C. 154(b) by 0 days.

(21) Appl. No.: 11/183,517

(22) Filed: Jul. 18, 2005

(51) Int. Cl.  
*F16D 66/02* (2006.01)

(52) U.S. Cl. .............................................. 188/1.11 W

(58) Field of Classification Search .......... 188/1.11 W, 188/1.11 L, 1.11 E; 116/208; 340/454  
See application file for complete search history.

(56) References Cited

U.S. PATENT DOCUMENTS

| | | | | |
|---|---|---|---|---|
| 2,914,144 A | * | 11/1959 | Hovell .................... | 188/106 R |
| 3,691,982 A | * | 9/1972 | Hawthorne .................. | 116/55 |
| 4,565,013 A | | 1/1986 | Medlock ...................... | 33/517 |
| 4,822,114 A | * | 4/1989 | Klein ...................... | 303/115.3 |
| 4,989,537 A | * | 2/1991 | Hutchinson et al. ........ | 116/208 |
| 5,244,061 A | * | 9/1993 | Hoyt et al. ............. | 188/1.11 W |
| 5,492,203 A | * | 2/1996 | Krampitz ............... | 188/1.11 W |
| 5,913,385 A | * | 6/1999 | Thibodeau ............. | 188/1.11 R |
| 6,059,074 A | * | 5/2000 | Crewson ................ | 188/1.11 W |
| 6,135,242 A | * | 10/2000 | Hockley ................ | 188/1.11 R |
| 6,394,233 B1 | | 5/2002 | Kanjo et al. ........... | 188/1.11 R |
| 6,753,771 B1 | * | 6/2004 | Lesesky ...................... | 340/479 |
| 6,904,698 B1 | * | 6/2005 | Halliar et al. .................. | 33/833 |

\* cited by examiner

*Primary Examiner*—Christopher P. Schwartz  
(74) *Attorney, Agent, or Firm*—Synnestvedt & Lechner LLP

(57) ABSTRACT

An indicator device indicating the travel of an air bag-type brake actuator when brakes are applied includes a stationary indicator plate having a cut out extending alongside the path of travel of the actuator. The cut out includes side edges positioned at acceptable minimum and maximum actuator expansion distances giving an indication of proper functioning of the brakes. The device further includes an integral mounting arm for mounting on a plate in the fixed end of the actuator. The mounting arm includes a slot for receiving an upper edge of the stationary measuring plate and a stud on a resilient portion of the arm. An aperture on the stationary measuring plate receives the stud when the arm is mount on it.

8 Claims, 4 Drawing Sheets

BRAKE ACTUATOR INDICATOR

FIELD OF THE INVENTION

This invention relates to brake actuators, especially brake actuators of the air bag or bellows type, for actuating the brakes of rail cars and similar vehicles and more particularly relates to an indicator for indicating the amount of air bag actuator travel when the brakes are applied.

BACKGROUND OF THE INVENTION

Conventional air bag or bellows-type actuators for rail car brakes are typically mounted on the rail car truck bolster. The air bag-type actuators are in construction structurally similar to a bellows. They are formed of a flexible fabric material which expands axially under pressure supplied by the rail car reservoir to move the brake shoes into engagement with the wheels of the rail car. In the description which follows, the terms "air bag-type" and "bellows-type" are used interchangeably. The actuator is pressurized in response to release of air under pressure from the rail car reservoir to cause axial expansion of the actuator which, in turn, moves the brake lever to move the brake shoes into engagement with the wheels of the rail car. Conventionally, the air bag-type actuators are equipped with a pair of plates attached at their movable and fixed ends, termed "measuring plates", which serve the purpose of providing a rail car inspector with relatively movable index marks for measuring the amount of travel of the actuator when the brakes are applied. This is done by the inspector using a tape measure placed against the measuring plates to measure the separation of the plates when the actuator has been inflated to the position in which the brakes are applied. This has proven to be an unduly time consuming procedure when a long string of rail cars needs to be checked, and in practice, the task is too often simply not done.

SUMMARY OF THE INVENTION

The present invention provides a simple and effective indicator of actuator travel which is adapted for use with conventional air brake-type actuators of the air bag or bellows-type without modification of existing equipment. The indicator device is simple to use, is light in weight yet durable and inexpensive. It is adapted to be fixed in position relative to the actuator in a matter of a few minutes time without the need for tools. If damaged, the indicator can be removed and replaced simply and quickly. An indication that the actuator travel is within acceptable limits can be easily determined without the need of a tape measure or other measuring instruments. In its preferred form, the indicator device comprises a molded plate-like member having fixed indicator marks which comprise the side edges of a cut out or window which is positioned relative to the movable end section of the actuator. So long as the measuring plate on the movable end of the actuator is within the confines of the indicator marks, the inspector knows that actuator travel is within acceptable tolerances.

In the preferred embodiment of the invention, the indicator device is of a generally L-shaped construction fabricated from a molded polymer. The indicator device includes a mounting arm for attachment to the fixed end of the actuator. Attachment is preferably provided by a groove in the arm which receives an upper edge of the measuring plate mounted at the stationary end of the actuator. The mounting arm further has a locking pin spaced from the groove which is positioned for insertion into an opening already provided in the measuring plate. The mounting arm is provided with sufficient resilience to cause the pin to snap-fit into the opening when the mounting arm is positioned on the fixed measuring plate, thereby locking the indicator device in place.

DETAILED DESCRIPTION OF THE PREFERRED EMBODIMENT

Figure 1:
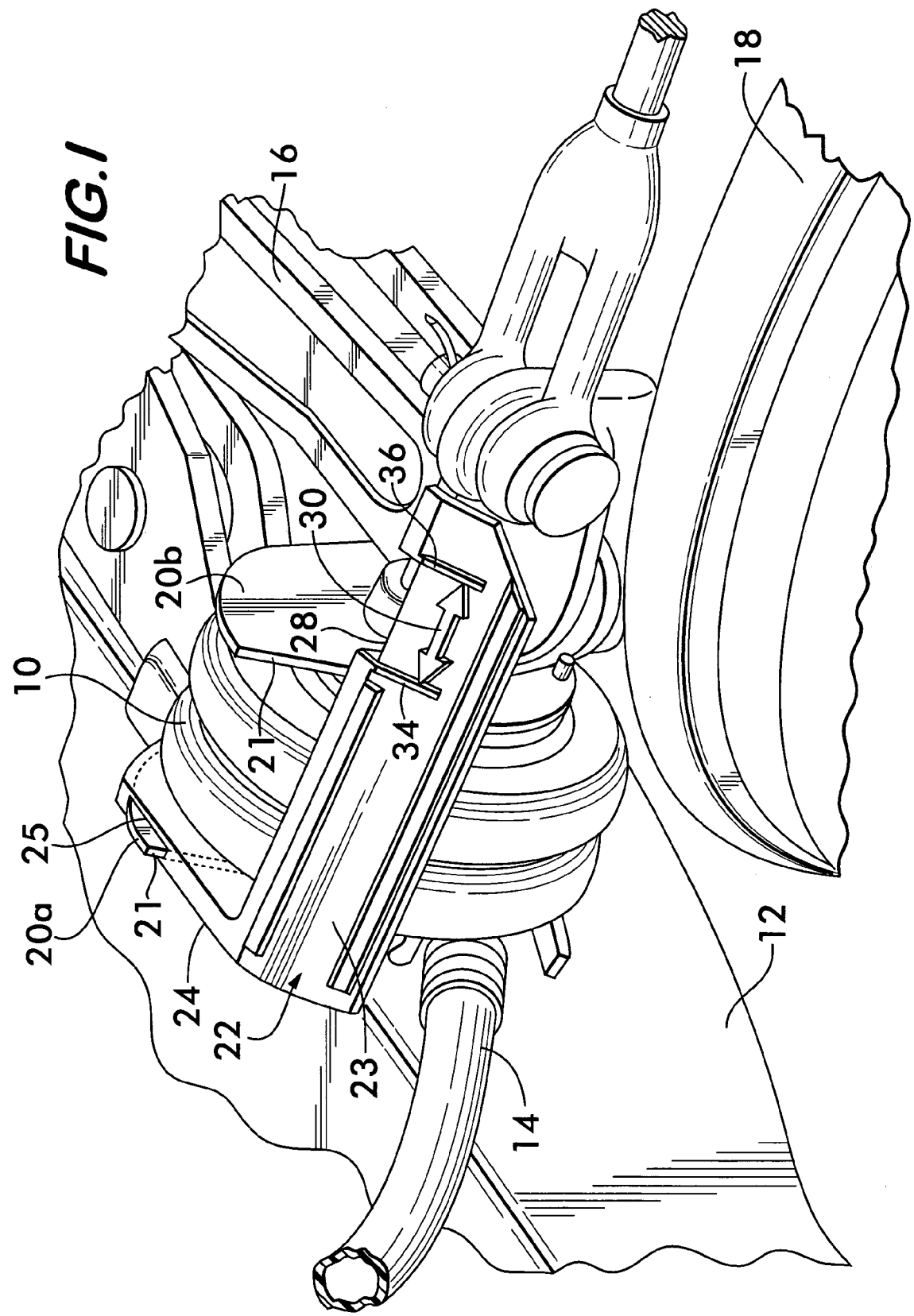
FIG. 1 is a perspective view of a portion of a rail car truck having an air bag-type actuator equipped with a brake actuator indicator made in accordance with the present invention.
Figure 2:
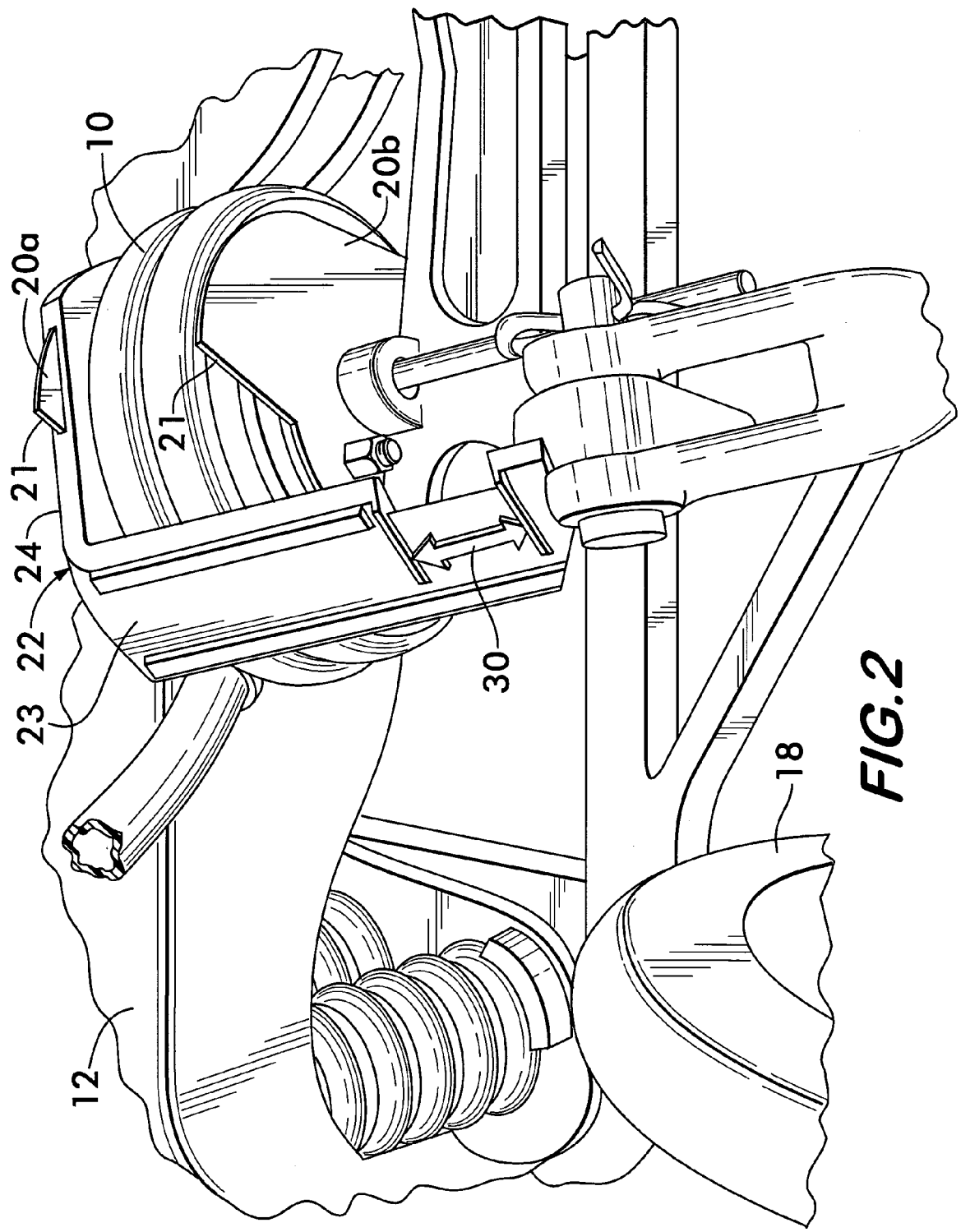
FIG. 2 is a perspective view of the rail car truck of FIG. 1, the parts being viewed towards the movable end of the brake actuator.

In FIGS. 1 and 2, an air bag-type actuator 10 of conventional construction is seen mounted on the bolster 12 of a conventional rail car truck. The actuator is connected to a supply of air under pressure via a brake line 14, and upon delivery of pressure thereto, expands axially away from the bolster 12 to move a brake lever 16, thereby moving the brakes (not shown) into engagement with the rail car wheels, a portion of one of which is shown at 18 in FIGS. 1 and 2. In FIGS. 1 and 2, the brake actuator is shown in the retracted position.

Air bag-type actuators of the type described are conventionally provided with a pair of measuring plates 20a and 20b affixed to the movable and fixed ends of the actuator respectively. The plates 20a and 20b are of substantially identical shape.

The purpose of the measuring plates 20a and 20b is to provide a rail car inspector with reference points for measuring the amount of travel of the movable end of the actuator when the brakes are applied. For this purpose, the plates each have a straight edge 21 against which a measuring tape may be applied. The indicator device of the invention, identified generally by reference character 22, makes use of these plates to provide a convenient way of determining if actuator travel is within acceptable limits without the need for a tape measure. As explained in more detail below, indicator device 22 is constructed to be mounted on stationary plate 20a and has indicating means which preferably is comprised of a cut out or window 28 and suitable indicia spaced relatively to the movable plate at locations indicating acceptable minimum and maximum actuator travel. If the plate is not visible within the boundaries of the window 28 when the brakes are applied, the inspector is immediately alerted to a malfunction of the actuator.

The indicator device 22, in its preferred form, comprises an indicator portion 23 which is generally rectangular and extends lengthwise of actuator 10. Portion 23 is preferably angled toward the actuator and is provided with a flange projecting toward the actuator away from its upper edge so as to be closely adjacent to the path of travel of movable plate 20b. Although suitably positioned indicator marks alone could be spaced on the first portion of the indicator device to indicate acceptable limits of travel of the actuator, in the preferred embodiment, cut out or window 28 is provided in the flange of indicator portion 23 adjacent one end. The side edges of the cut out or window 28 are spaced apart a distance equivalent to the acceptable minimum and maximum limits of actuator travel. The cut out or window is positioned relatively to the actuator so that one can see whether or not actuator travel is within those limits when the brakes are applied. If the movable plate is not within the limits when the brakes are applied, the inspector is alerted to the fact that there is a malfunction and that the brakes are not in working order.

Figure 3:
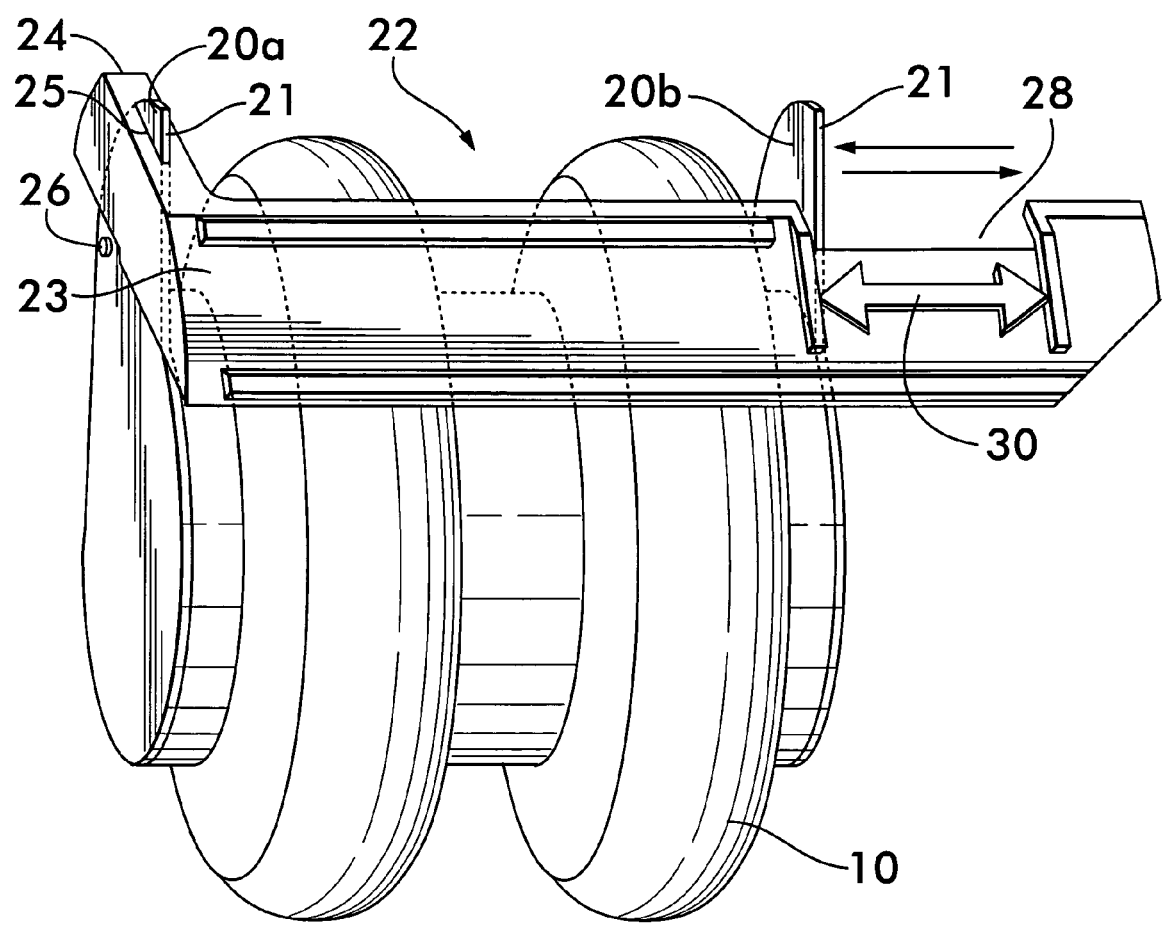
FIG. 3 is a detailed view, in perspective, illustrating the brake actuator indicator.
Figure 4:
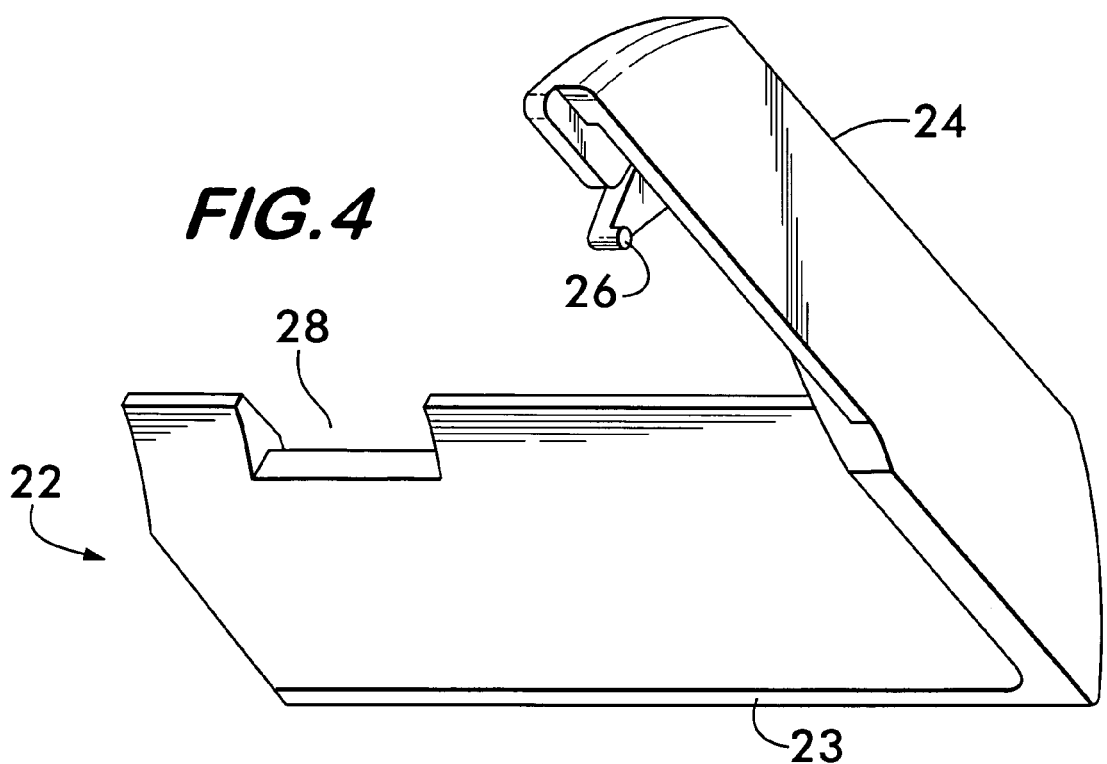
FIGS. 4 and 5 are views of the reverse and front sides of the indicator.

The indicator device further comprises a mounting arm 24 extending substantially at right angles to the indicator portion 23. The mounting arm 24 has a slot 25 extending from its bottom edge upwardly through its top edge. The slot is dimensioned to receive an upper corner of edge 21 of stationary measuring plate 20*a* and thereby maintains indicator portion 23 in proper position relative to the actuator 10 and movable measuring plate 20*b*. Facing ribs 25*b* formed within slot 25 (see FIGS. 3 and 4) are positioned to provide an interference fit with measuring plate 20*a*. The mounting arm further has a depending locking projection 26 (FIG. 3) which extends towards rear measuring plate 20*a* and is dimensioned to fit through an opening (not shown) which is pre-drilled in that plate as a standard feature.

Figure 5:
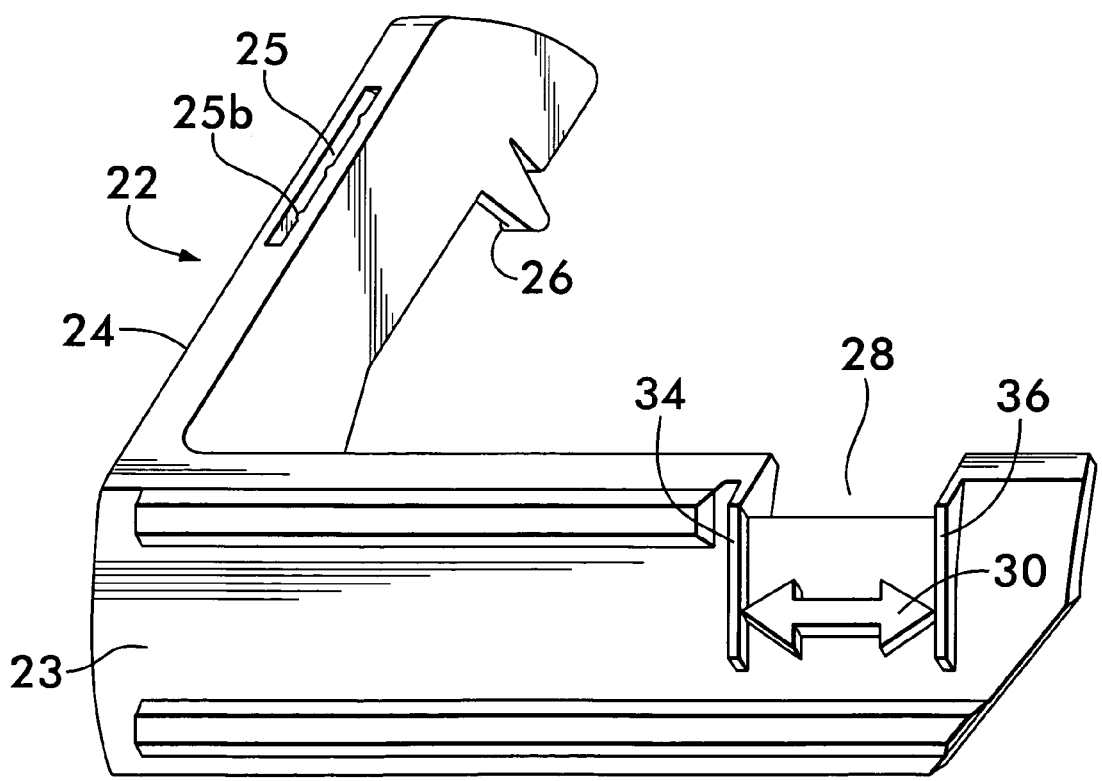

The actuator indicator device is preferably formed of a polymeric material, such as urethane, although other lightweight, durable materials may be employed, and is conveniently formed as a unitary device by injection molding or a similar process. In its preferred mode of implementation, ribs 34 and 36, shown in FIGS. 1 and 5, are provided as index markings which extend downwardly from the side edges of the cut out or window and are separated by a molded double-headed arrow symbol 30, emphasizing to the viewer the function of the cut out.

In summary, it can be seen that the indicator device of the present invention provides a quick and convenient way of determining actuator travel without the need of measuring tools. The device makes use of the measuring plates already connected to the actuator for support and for determining that the actuator travel is within acceptable limits. The device is inexpensive to make, is characterized by ease of installation and does not add appreciably to the weight of the rail car.

What is claimed is:

1. An indicator device for determining acceptable limits of travel of a linearly expandable air-bag type brake actuator for railcar brakes, said brake actuator being mounted on a truck bolster of the railcar and having interconnecting mechanical linkage for actuation of a railcar brake mounted on the truck adjacent the railcar wheels, said brake actuator further including a first measuring plate fixed relative to the truck bolster and a second measuring plate disposed at the movable end of the brake actuator for movement therewith upon linear movement of the brake actuator, said indicator device comprising an indicator arm having an indicator portion for indicating the extent of travel of the second measuring plate upon actuation of the brake actuator, said indicator device further including a mounting arm joined to the indicator arm, said mounting arm extending in a direction transversely thereto, said mounting arm having an opening formed to receive the projecting edge portion of the first measuring plate and a flexibly resilient portion spaced from the opening, said flexibly resilient portion having an interlocking projection, and said first measuring plate having an aperture, said interlocking projection being positioned to interfit within said aperture when the projecting edge portion is seated within said opening for locking said indicator device in position to indicate whether the brake actuator is within said acceptable limits of travel.

2. An indicator device according to claim 1, wherein said mounting arm includes parallel downwardly extending walls having upper edges joined by a relatively planar joining wall portion, said opening being positioned within said planar joining wall portion, said downwardly extending walls sandwiching said first measuring plate when the projecting edge portion of said first measuring plate is seated within said opening and the interlocking projection is within said aperture.

3. An indicator device according to claim 2, wherein said opening is provided with facing ribs within said opening spaced to provide an interference fit with said first measuring plate.

4. An indicator device according to claim 3, wherein said opening is provided with facing ribs within opening space to provide an interference fit with said first measuring plate when the first measuring plate is seated within said opening.

5. An indicator device according to claim 2, wherein said mounting arm further includes a generally downwardly extending member, said member being flexible and resilient, and wherein said interlocking projection is positioned on said downwardly extending member for interfitting within said aperture.

6. An indicator device according to claim 1, wherein said indicator arm includes an indicator window having parallel side edges spaced in alignment with minimum and maximum limits of acceptable actuator motion resulting from actuation of the railcar brakes.

7. An indicator device according to claim 6, wherein said indicator arm includes a portion sloped generally towards said actuator, said window being formed in said sloped portion and in generally overlying relationship with said second measuring plate.

8. An indicator device according to claim 1, wherein said opening in the mounting arm contains facing ribs spaced to form an interference fit with the edge portions of said first measuring plate when the first measuring plate is seated within said opening.

* * * * *